(12) United States Patent
Arita et al.

(10) Patent No.: US 6,525,917 B1
(45) Date of Patent: Feb. 25, 2003

(54) POWER TRANSFORMING SYSTEM AND METHOD

(75) Inventors: Hiroshi Arita, Mito (JP); Takahide Matsuo, Hitachi (JP); Satoshi Watahiki, Hitachi (JP); Shingo Shirakawa, Hitachi (JP); Naoki Kasahara, Mito (JP); Shinichi Kondo, Hitachi (JP); Tokio Yamagiwa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/371,525

(22) Filed: Aug. 10, 1999

(30) Foreign Application Priority Data

Aug. 11, 1998 (JP) .......................................... 10-226694

(51) Int. Cl.$^7$ ................................................ H02H 3/00
(52) U.S. Cl. ............................ 361/63; 361/54; 361/117
(58) Field of Search ............................... 361/54, 55, 57, 361/58, 62, 63, 111, 117, 67, 118, 126, 127, 131, 136; 307/125, 129; 700/292

(56) References Cited

U.S. PATENT DOCUMENTS

| | | | |
|---|---|---|---|
| 4,464,696 A | * 8/1984 | Masui et al. | ................... 361/43 |
| 4,477,855 A | * 10/1984 | Nakayama et al. | ............ 361/54 |
| 5,473,494 A | * 12/1995 | Kurosawa et al. | ........... 361/131 |
| 5,532,897 A | 7/1996 | Carpenter, Jr. | ............... 361/118 |
| 6,061,216 A | * 5/2000 | Fuqua, III | .................... 361/115 |

FOREIGN PATENT DOCUMENTS

| | | | | |
|---|---|---|---|---|
| JP | 56-71427 | | 6/1981 | |
| JP | 402105073 A | * | 4/1990 | .................. 324/555 |

\* cited by examiner

*Primary Examiner*—Ronald W. Leja
(74) *Attorney, Agent, or Firm*—Mattingly, Stanger & Malur, P.C.

(57) ABSTRACT

This invention is to provide a transforming system capable of satisfactorily protecting the equipment of a substation even if a aerial electric power lines is struck directly by an intense electric shock of a large energy, such as an electric shock of a waveform similar to that of a thunderbolt stroke having a long duration of wave tail. So, this invention, a transforming system comprises, a lightning arrester, a ground fault device installed near a service entrance through which the power lines are led in, a voltammeter placed on the gas-insulated switchgear, and a control device receiving a signal from the voltammeter and providing a signal for controlling the grounding device. And when detecting of said thunderbolt arising in said aerial electric power line, a control device which order said ground fault device to make the ground fault condition.

3 Claims, 7 Drawing Sheets

ENERGY MONITOR

POWER TRANSFORMING SYSTEM AND METHOD

FIELD OF THE INVENTION

The present invention relates to a transforming system and a method of controlling the same and, more particularly, to a transforming system capable of satisfactorily protecting its components when a lightning stroke of large energy is exerted on transmission lines.

BACKGROUND OF THE INVENTION

Generally, ground wires are laid along over head transmission lines to protect the overhead transmission lines from direct lightning strokes by carrying the current of a lightning discharge through a transmission line tower to the ground. However, it is difficult to completely prevent damage to overhead transmission lines from direct lightning strokes by the ground wires when direct lightning strikes occur. When a transmission line is struck directly by lightning, a lightning surge acts on the substation. Even if a direct lightning stroke on the substation is evaded, a lightning surge acts on the substation when the potential of the ground wire and the transmission line tower rises and a reverse flashover occurs. Since the overhead transmission line of a trunk line system, such as 500 kV, UHV overhead transmission lines, are laid in relatively hilly districts, sometimes horizontal lightning discharges occur and it is desired to protect aerial electric power lines from horizontal lightning discharges.

By establishing a lightning arrester in the substation, the overvoltage in the lightning stroke is suppressed.

However, when the energy of a lightning stroke exceeds the ability of the lightning arrester to suppress the over voltage, damage can occur. Further, once the lightning arrester loses the function of suppressing overvoltage, the substation protected by the lightning arrester can be damaged by a subsequent lightning stroke.

U.S. Pat. No. 5,532,897 and Japan Laid-Open 1981-71427 are prior art examples of protection systems using conventional lightning arrester.

The number of transmission line towers must be increased to protect overhead transmission lines from electric shocks, which, however, requires great expense. Ground wires cannot necessarily completely protect transmission lines from electric shocks even if the number of ground wires is increased.

And, means of protection of lightning arrester has not been shown in the Prior Art.

SUMMARY OF THE INVENTION

Accordingly, it is an object of the present invention to provide a transforming system and a method of controlling the same capable of satisfactorily protecting the equipment of a substation even if a transmission line is struck directly by an intense electric shock of a large energy, such as an electric shock of a waveform similar to that of a lightning stroke having a long duration (wave tail).

With the foregoing object in view, according to one aspect of the present invention, a power transforming system includes an overhead transmission line, and a transformer is connected with said overhead transmission line by the electric power line and a lightning arrester is connected with said electric power line, a grounding device is connected with said electric power line. When a lightning stroke is detected as arising in said overhead transmission line, a control device controls said ground fault device to make the ground fault condition whereby said grounding device protects said lightning arrester from said thunderbolt.

According to another aspect of the present invention, said grounding device is established between said overhead transmission line and said lightning arrester.

According to another aspect of the present invention, a circuit breaker is established between said overhead transmission line and said transformer, and said control device equipment cuts off said circuit breaker, after said ground fault device is operated.

According to another aspect of the present invention, a circuit breaker is established between said lightning arrester and said transformers, and said control device equipment cuts off said circuit breaker, after said ground fault device is operated.

According to another aspect of the present invention, said control device detects the thunderbolt by detecting the voltage and current state of said electric power line, and said control device provides an order signal for operating said grounding device.

According to another aspect of the present invention, said control device detects the thunderbolt by detecting the power frequency of said electric power line, and said control device provides an order signal for operating said grounding device.

According to another aspect of the present invention, a transformer connected with said overhead transmission line by the electric power line detects the thunderbolt by detecting the electric power condition of said aerial electric power line, and a ground fault condition is made in said electric power line after detecting that a thunderbolt arose in said aerial electric power line.

DETAILED DESCRIPTION OF THE INVENTION

Preferred embodiments of the present invention will be described with reference to FIGS. 1 to 9.

Figure 1:
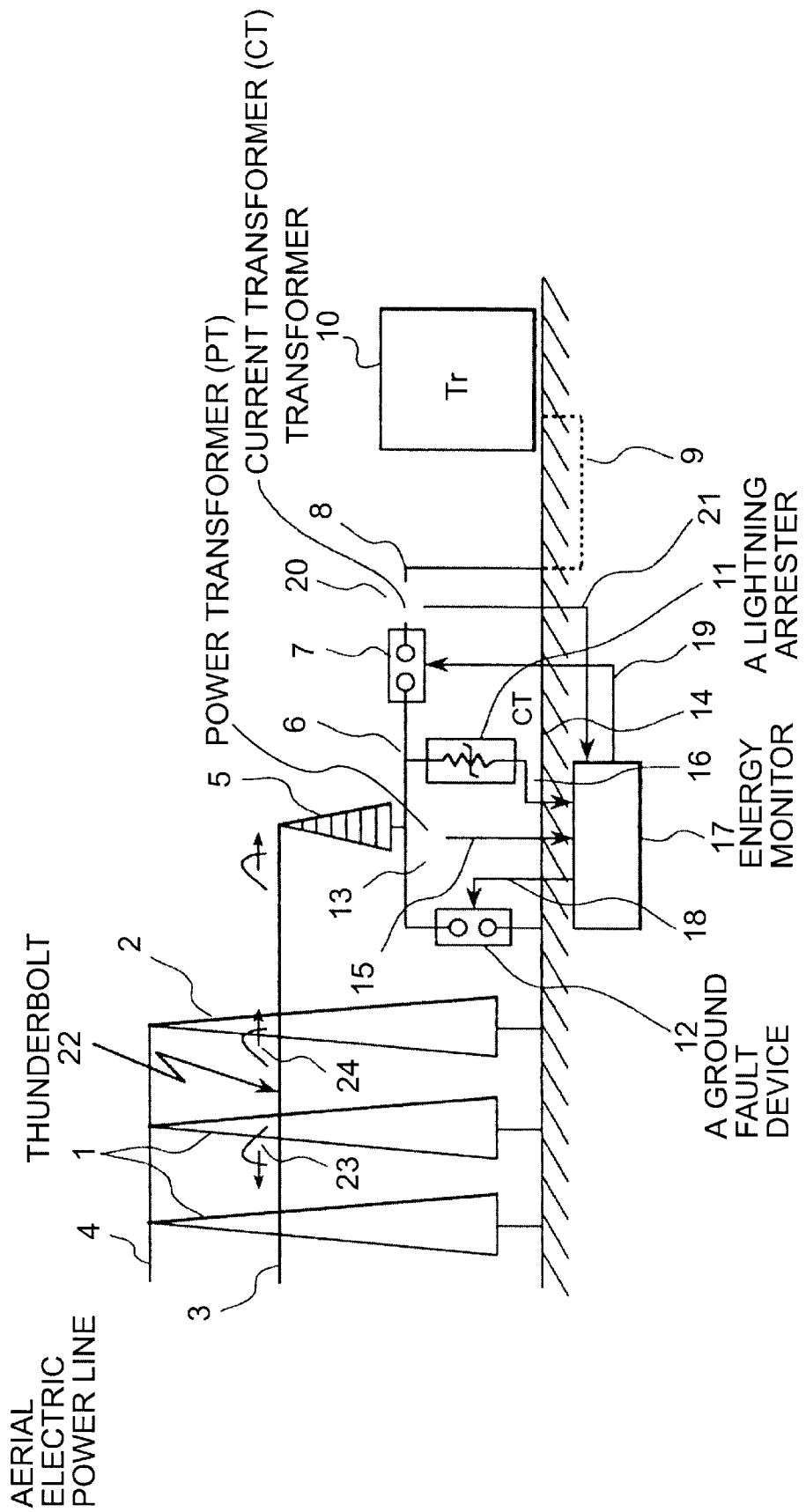
FIG. 1 is a diagrammatic view of a transforming system in a preferred embodiment according to the present invention.

Referring to FIG. 1, the transforming system comprises a transmission system and a substation. The transmission system comprises transmission line towers 1 arranged on a transmission route, a dead-end tower 2 installed near the substation, power lines 3 supported on the transmission line towers 1 and the dead-end tower 2, and a ground wire 4. The ground wire 4 is supported on upper ends of the transmission line towers 1 and the dead-end tower 2 to evade direct lightning strokes. The terminal end of the aerial earthing line 4 is connected to the dead-end tower 2.

The power lines 3 suspended from suspension insulators (not shown) are connected to bushings 5 installed at the entrance of the substation. A gas-insulated switchgear is installed in the yard of the substation. The bushings 5 are connected to busbars 6. The busbars 6 are connected through a transmission line circuit breaker 7, busbars 8 and a cable 9 to a substation transformer 10. An overvoltage protecting lightning arrester 11 and a grounding device 12 are connected to the busbars 6. This ground fault device 12 constitutes the parallel circuit for lightning arresters 11 at the entrance of the substation, and the ground device 12 is desirably connected with the bus bars 6 between the bushings 5 and lightning arrester 11. The power lines are three-phase electric power lines.

A PT 13 for voltage measurement is connected to the busbars 6, a CT 14 for current measurement is connected to the lightning arrester 11, and a CT 20 for busbar current measurement is connected to the transmission line circuit breaker 7. The PT 13 for voltage measurement, the CT 14 for current measurement and CT 20 for busbar current measurement are connected respectively by signal lines 15, 16 and 21 to an energy monitor 17. Control signal lines 18 and 19 installed at the energy monitor 17 are connected to the ground device 12 and the transmission line circuit breaker 7 respectively. In FIG. 1, only one of the overhead transmission lines for three phases is shown for simplicity. The grounding device 12 is of a three-point gap type, of a field strain gap type or a laser trigger gap type, or a low-voltage high-current lightning arrester. Then, it becomes possible that the large current of high tension is run in the ground, even if a thunderbolt of large current in which lightning arrester is damaged arises, since the ground device has a current capacity about 100 kA.

When the power line 3 of the transforming system is struck by a direct lightning stroke 22, lightning surge currents 23 and 24 are generated, and the lightning surge current 24 flows through the bushing 5 into the substation. For example, if a transmission line of a 500 kV trunk line system is struck by a direct lightning stroke of 25 kA, an overvoltage of about 3000 kV is generated at the struck part of the transmission line and a lightning surge current 24 in the range of eight to ten or so kiloamperes flows through the transmission line. The lightning arrester 21 installed at the entrance of the substation limits the magnitude of the overvoltage on the equipment in the substation to protect the equipment of the substation. If the lightning surge current has a long duration having a wave tail of, for example, 1 ms) and the discharge voltage is 870 kV, the amount of energy of the lightning surge is at least 8.7 MJ or more (=870 kV10 kA1 ms). It is possible that such a large amount of energy exceeds the withstand energy of the lightning arrester and causes the lightning arrester to explode. Once the lightning arrester loses its function due to a first lightning stroke, the transformer might be damaged if a subsequent lightning stroke were to occur. However, by providing grounding device 12, which can deal with a large amount of energy, the lightning arrester can be protected even if the lightning arrester is not able to deal with the lightning surge current generated by the thunderbolt.

Signals provided by the PT 13 for voltage measurement and the CT 14 for current measurement are given to the energy monitor 17 to monitor input data. The energy monitor 17 calculates energy accumulation and an expected amount of energy on the basis of data and, if the expected amount of energy is a critical amount, it provides a signal through the control signal line 18, thereby controlling the grounding device 12 to create an intentional ground fault. The energy monitor 17 gives a signal through a control signal line 19 to the transmission line circuit breaker 7 a set delay time after the creation of the intentional ground fault to cut off a ground fault current. Generally, the protective relay equipment (it is not illustrated) judges that a usual ground fault and short circuit accident arose in the electric power line, and causes the transmission line circuit breakers 7 to be operated in the appropriate order. However, the transmission line circuit breaker 7 is not operated in the usual order caused by the protective relay equipment, since the accident has already arisen as a result of the lightning stroke. That is, the order from the energy monitor 17 precedes the usual ground fault determination.

The operation timing of the ground device 12 and the transmission line circuit breaker 7 may be made simultaneous. That is, generally the transmission line circuit breaker interception operation occurs after a two stroke cycle (40 ms in a 50 Hz power line), so first the grounding device 12 is actuated and then the transmission line circuit breaker 7 is opened after several 10 ms periods.

Further, the length of time of the ground fault condition which the grounding device 12 produces is several ms. Once the grounding device 12 makes the ground fault condition, the ground fault condition is stopped. Immediately afterwards, it is possible that the energy monitor 17 again produces a ground fault condition. In such a case, the grounding device 12 would again produce the ground fault condition.

Figure 4:
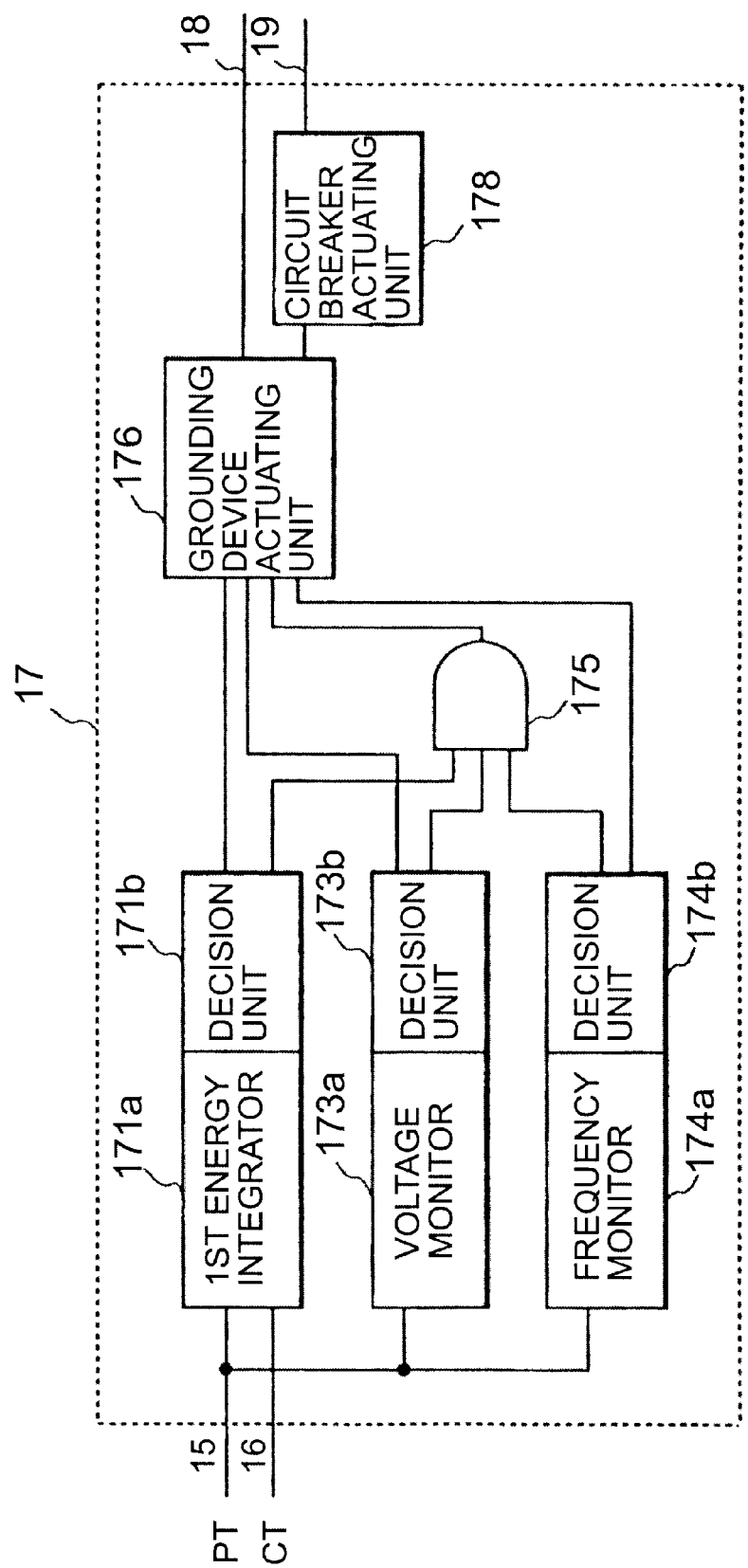
FIG. 4 is a block diagram of an energy monitor.

Referring to FIG. 4, the energy monitor 17 comprises an energy integrator 171a, a voltage monitoring unit 173a, a frequency monitoring unit 174a, and decision units 171b, 173b and 174b. The energy integrator 171a and the decision unit 171b are connected to the voltage signal line 15 and the current signal line 16, the voltage monitoring unit 173a and the decision unit 173b are connected to the voltage signal line 15, and the frequency monitoring unit 174a and the decision unit 174b are connected to the voltage signal line 15. The respective outputs of the decision units 171b, 173b and 174b are given to an AND circuit 175. The respective outputs signals of the AND circuit 175, and the decision units 171b, 173b and 174b are given to a grounding device actuating unit 176. The grounding device actuating unit 176 is connected to the control signal line 18 and through a circuit breaker actuating unit 178 to the control signal line 19. The circuit breaker actuating units 178 operate a set delay time after the action of the grounding device 12.

Upon the increase of the amount of energy calculated by the energy integrator 171a beyond a set level, the grounding device actuating unit 176 provides a signal on the control signal line 18 to actuate the grounding device so that an intentional ground fault is created. Consequently, the explosion of the lightning arrester 11 can be avoided. Subsequently, the circuit breaker actuating unit 178 provides a control signal on the control signal line 19 to actuate the transmission line circuit breaker 7.

The voltage monitoring unit 173a and the decision unit 173b actuate the grounding device actuating unit 176 when the amplitude of a voltage wave is greater than a set level. For example, if a negative electric shock is superposed on the crest value of a positive ac voltage, a large potential difference is detected and the grounding device actuating unit 176 is actuated. The frequency monitoring unit 174*a* and the decision unit 174*b* actuate the grounding device actuating unit 176 when the frequency of a lightning surge current approaches the resonance frequency of the substation transformer 10. When all decisions on the calculated amount of energy, the measured voltage and the measured frequency made by the decision units 171*b*, 173*b* and 174*b* are true, the AND circuit 175 provides a signal to actuate the grounding device actuating unit 176.

Figure 2:
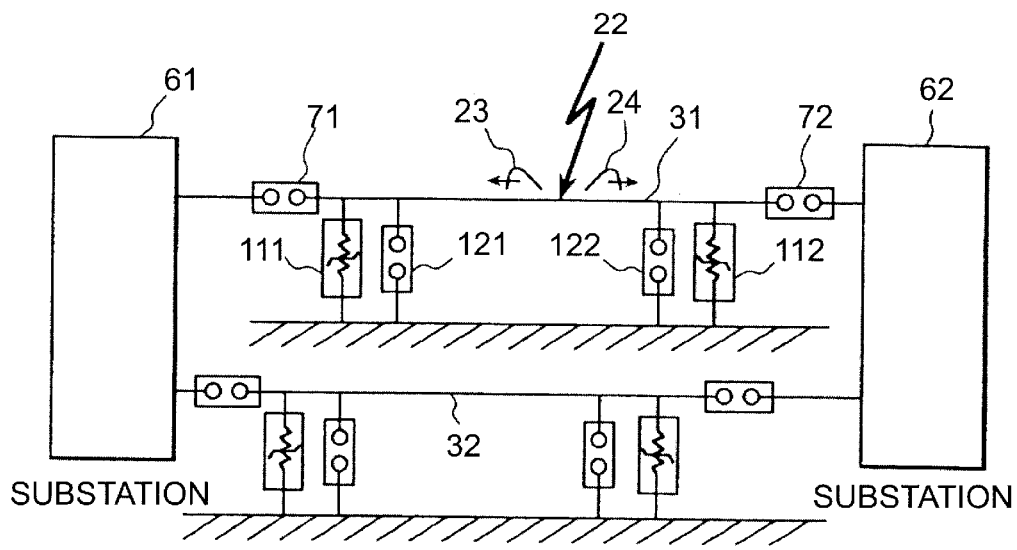
FIG. 2 is a diagrammatic view of a transforming system in accordance with the present invention having two lines formed between substations.

FIG. 2 shows the operation situation of a practical example of the embodiment of FIG. 1.

Figure 3:
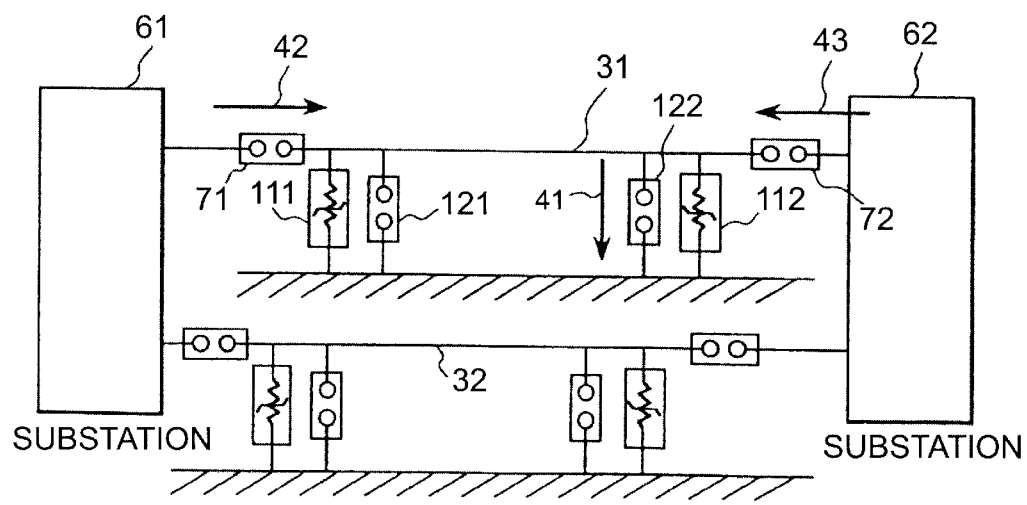
FIG. 3 is a diagrammatic view of assistance in explaining the operations of the transforming systems shown in FIG. 2.

When two substations 61 and 62 are connected by two power lines 31 and 32 as shown in FIG. 2, a lightning arrester 111, a grounding device 121 and a transmission line circuit breaker 71 are installed at the entrance of the substation 61, and a lightning arrester 112, a grounding device 122 and a transmission line circuit breaker 72 are installed at the entrance of the substation 62. When the power line 31 is struck by a direct lightning stroke 22 as shown in FIG. 2, data is transmitted through a signal line to an energy monitor, not shown, as mentioned in the foregoing description made in connection with FIG. 1, and the energy monitor provides a control signal to operate the grounding device 122. In this state, currents 42 and 43 flow from the substations 61 and 62 as shown in FIG. 3. The sum of the currents 42 and 43 is a ground fault current 41. Consequently, the transmission line circuit breakers 71 and 72 exercise functions similar to those exercised in an ordinary ground fault to cut off the currents 42 and 43. Thus, the power line 31 is disconnected and power is transmitted through the sound power line 32. Then the transmission line circuit breakers 71 and 72 operate for high-speed reclosing to restore a sound state in which power can be transmitted through both the lines.

This embodiment additionally includes the energy monitor and the grounding device to protect the equipment of the substation by detecting a lightning surge current and to create an intentional ground fault.

Figure 5:
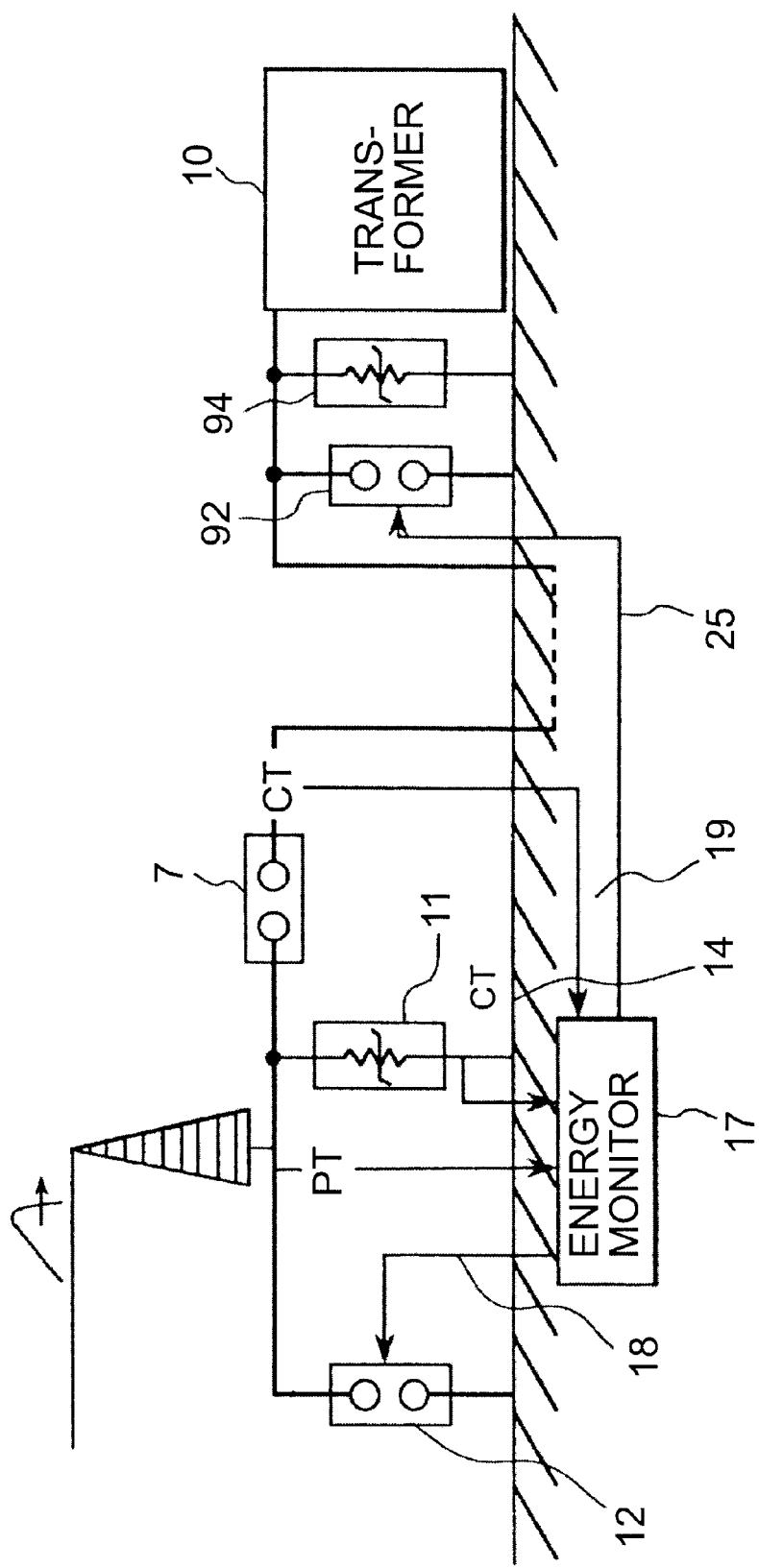
FIG. 5 is a diagrammatic view of a transforming system in another embodiment according to the present invention.

FIG. 5 is another practical example. This practical example establishes a second grounding device 92. A second lightning arrester 94 was established before transformer 10, and after the transmission line circuit breakers 7. And the second grounding device 92 was established before the second lightning arrester 94, and after the transmission line circuit breakers 7.

Figure 6:
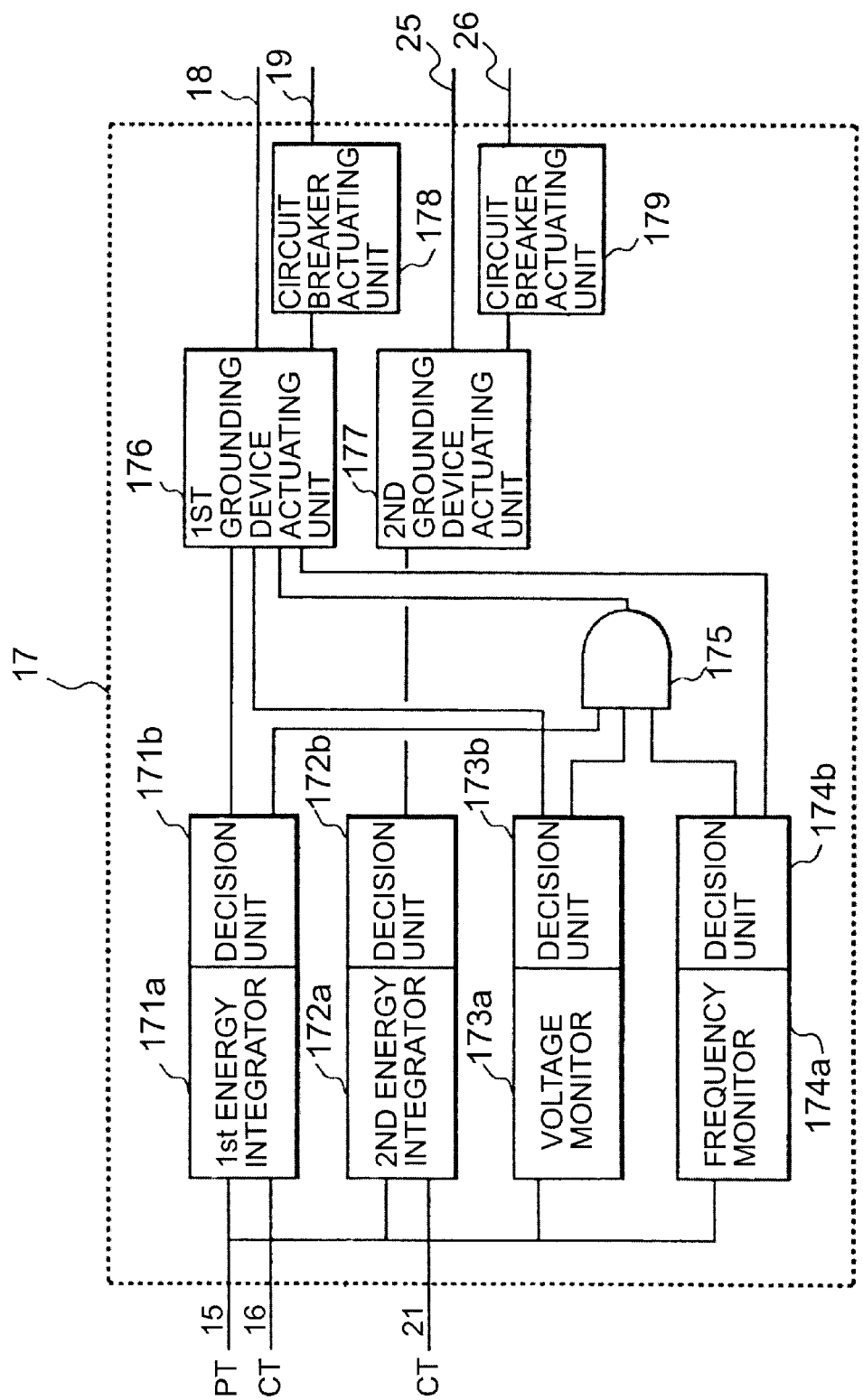
FIG. 6 is a block diagram of the transforming systems shown in FIG. 5.

FIG. 6 shows the control circuit of FIG. 5. Referring to FIG. 6, the energy monitor 17 comprises a first energy integrator 171*a*, a second energy integrator 172*a*, a voltage monitoring unit 173*a*, a frequency monitoring unit 174*a*, and decision units 171*b*, 172*b*, 173*b* and 174*b*. The first energy integrator 171*a* and the decision unit 171*b* are connected to the voltage signal line 15 and the current signal line 16, the second energy integrator 172*a* and the decision unit 172*b* and connected to the voltage signal line 15 and the current signal line 21, the voltage monitoring unit 173*a* and the decision unit 173*b* are connected to the voltage signal line 15, and the frequency monitoring unit 174*a* and the decision unit 174*b* are connected to the voltage signal line 15. The respective outputs of the decision units 171*b*, 173*b* and 174*b* are given to an AND circuit 175. The respective output signals of the AND circuit 175, and the decision units 171*b*, 173*b* and 174*b* are given to a first grounding device actuating unit 176. The output signal of the decision unit 172*b* is given to a second grounding device actuating unit 177. The first grounding device actuating unit 176 is connected to the control signal line 18 and through a circuit breaker actuating unit 178 to the control signal line 19. The second grounding device actuating unit 177 is connected to a control signal line 25 and through a circuit breaker actuating unit 179 to a control signal line 26. The circuit breaker actuating units 178 and 179 operate a set delay time after the action of the grounding device 12.

Upon the increase of the amount of energy calculated by the energy integrator 171*a* beyond a set level, the first grounding device actuating unit 176 provides a signal on the control signal line 18 to actuate the grounding device so that an intentional ground fault is created. Consequently, the explosion of the lightning arrester 11 can be a avoided. Subsequently, the circuit breaker actuating unit 178 provides a control signal on the control signal line 19 to actuate the transmission line circuit breaker 7.

The voltage monitoring unit 173*a* and the decision unit 173*b* actuate the first grounding device actuating unit 176 when the amplitude of a voltage wave is greater than a set level. For example, if a negative electric shock is superposed on the crest value of a positive ac voltage, a large potential difference is detected and the first grounding device actuating unit 176 is actuated. The frequency monitoring unit 174*a* and the decision unit 174*b* actuate the first grounding device actuating unit 176 when the frequency of a lightning surge current approaches the resonance frequency of the substation transformer 10. When all decisions on the calculated amount of energy, the measured voltage and the measured frequency made by the decision units 171*b*, 173*b* and 174*b* are true, the AND circuit 175 provides a signal to actuate the first grounding device actuating unit 176.

The energy integrator 172*a* and the decision unit 172*b* monitor the energy of a lightning surge current flowed through the lightning arrester 21 installed at the entrance of the substation, and actuate the second grounding device actuating unit 177 when the energy exceeds a set level. For example, a grounding device installed near the substation transformer 10 is operated to create an intentional ground fault. And it becomes possible that the second lightning arrester 94 is surely protected.

Figure 7:
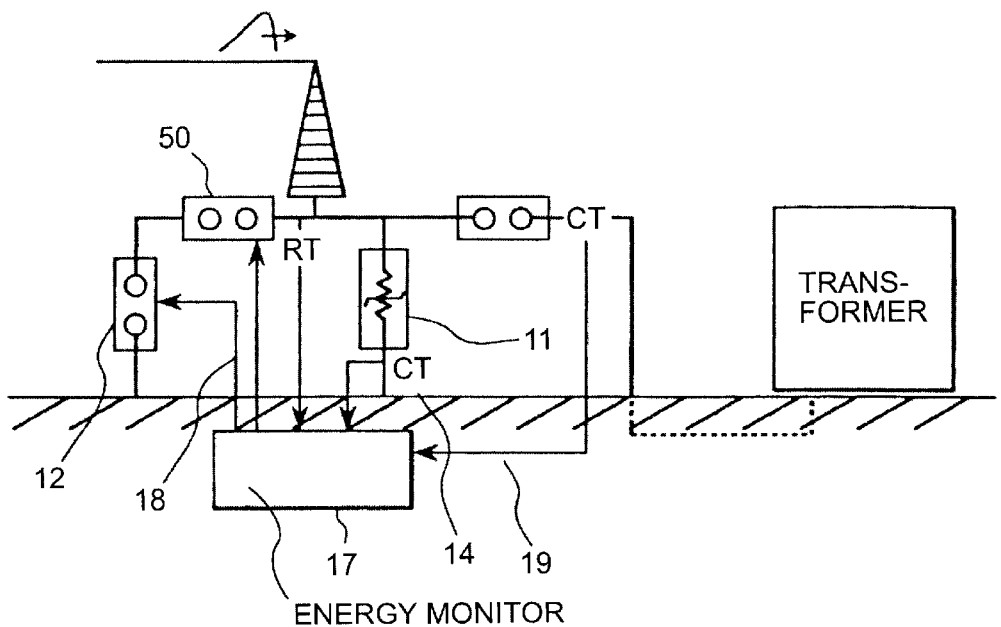
FIG. 7 is a diagrammatic view of a grounding device including a circuit breaker.

A transforming system shown in FIG. 7 is provided with a circuit breaker 50 connected to a grounding device 12. This circuit breaker 50 is a high-speed circuit breaker capable of operating in a subcycle to one cycle. In the embodiment shown in FIG. 1, this arrangement achieves high-speed protection to enhance the reliability of the transforming system because the duration of a lightning surge is on the order of 4 ms when the existing transmission line circuit breaker needs time corresponding to about three cycles for operation.

Figure 8:
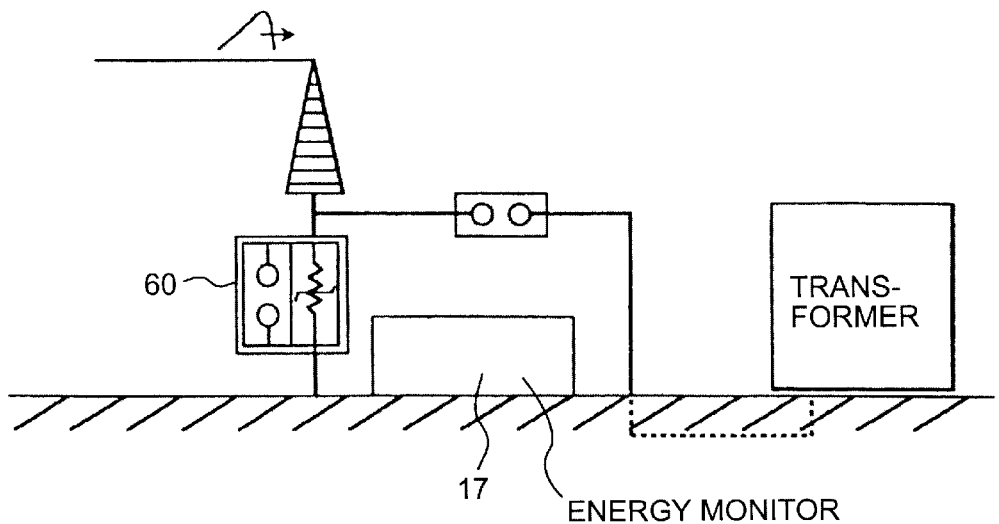
FIG. 8 is a diagrammatic view of an arrangement in which a lightning arrester and a grounding device are contained in one tank.

A transforming system shown in FIG. 8 has a tank 60 containing a lightning arrester 11 and a grounding device 12. This arrangement is effective in forming a gas-insulated switchgear in a compact construction and in providing a small, economically advantageous transforming system.

Figure 9:
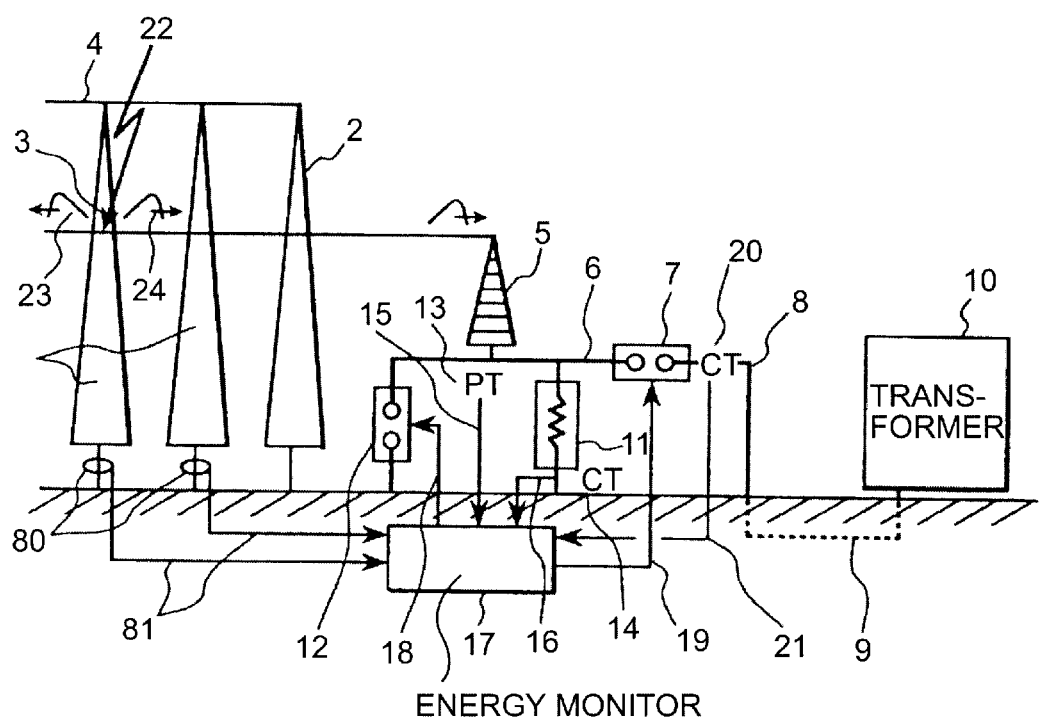
FIG. 9 is a diagrammatic view of a transforming system in a modification of the foregoing embodiment.

A transforming system in a modification of this embodiment will be described with reference to FIG. 9. FIG. 9 shows the construction of the transforming system in this embodiment. The transforming system in this embodiment is similar in construction to the transforming system shown in FIG. 1. As shown in FIG. 9, the transforming system has lightning current monitors 80 attached to transmission line towers 1 to monitor lightning current. The output terminal of each lightning current monitor 80 is connected to an energy monitor 17 by a signal line 81. The lightning current monitors 80 are Rogowski current sensors or optical PCTs (potential current transformers).

When the intensity of the current of a direct lightning stroke 22 is high, the overvoltage of a part of a transmission line 3 struck by the direct lightning stroke increases, and a current flows through the transmission line tower 1 if positive flashover occurs across arcing horns. The lightning current monitor 80 detects this current. A lightning current can be estimated from data on the current, and data on the lightning current can be used for control.

Still, though in the above-mentioned practical example, the transmission line circuit breaker was shown as the switchgear which cuts off the current, it is possible to use a gas circuit breaker type, air circuit breaker type and oil circuit breaker type, etc. as the circuit breaker, so long as the electric power line can be cut off by the breaker. And, though the above-mentioned practical example shows the configuration position of the grounding device 12 as being after bushings 5 the grounding device 12 may be before bushings 5. In such an arrangement, it is possible to protect all equipment after the bushing on the transformer side.

According to the present invention, the equipment of the substation can be protected even when the transmission line is struck directly by an intense electric shock of a large energy, such as an electric shock of a waveform similar to that of a lightning stroke (having a long duration wave tail). After protective operations for protecting the equipment have been completed, the transforming system is able to restore its power transmitting condition quickly after the transmission line has been struck by a direct lightning stroke.

What is claimed is:

1. A power transforming system, which has an overhead transmission line and a transformer connected with said overhead transmission line by an electric power line, comprising:

lightning arrester means for eliminating over voltage, which is established between said overhead transmission line and said transformer, and ground fault means for making a ground condition which is connected to said electric power line; and control means for detecting a thunderbolt arising in said overhead transmission line, wherein when said control means detects a thunderbolt, said control means commands said ground fault means to make a ground condition in said overhead transmission line in which said thunderbolt arose so that said ground fault means protects said lightning arrester means from said thunderbolt;

further including circuit breaker means for breaking electric power, which is established between said overhead transmission line and said transformer, and said control means further commands said circuit breaker means to break electric power, after said ground fault means is operated.

2. A controlling method for power transforming that includes an overhead transmission line and a transformer connected with said overhead transmission line by an electric power line, comprising the steps of:

detecting a thunderbolt by detecting an electric power condition of said overhead transmission line;

setting a ground fault condition in said electric power line after detecting the thunderbolt in said overhead transmission line;

wherein power to the overhead transmission line is cut off when said ground fault condition is made in said electric power line.

3. A controlling method for power transforming that includes an overhead transmission line and a transformer connected with said overhead transmission line by an electric power line, comprising the steps of:

detecting a thunderbolt by detecting an electric power condition of said overhead transmission line;

setting a ground fault condition in said electric power line after detecting the thunderbolt in said overhead transmission line;

wherein power to the overhead transmission line is cut off when said ground fault condition is made in said electric power line;

wherein power to said overhead transmission line is cut off for a predetermined period, after said ground fault condition is made in said electric power line.

* * * * *